United States Patent [19]

Atasoy et al.

[11] 4,038,476
[45] July 26, 1977

[54] PROCESS FOR THE PRODUCTION OF POLY-N-VINYLPYRROLIDONE GRANULES CONTAINING IODIDE

[75] Inventors: Kaya Atasoy, Munchenstein; Karl Franz Weckwarth, Basle; Walter Reinhardt, Pratteln, all of Switzerland

[73] Assignee: Ciba-Geigy Corporation, Ardsley, N.Y.

[21] Appl. No.: 635,027

[22] Filed: Nov. 25, 1975

[30] Foreign Application Priority Data

Dec. 2, 1974 Switzerland .................. 15956/74

[51] Int. Cl.² ............................................. C08K 3/16
[52] U.S. Cl. ................................. 528/485; 424/80; 526/4; 528/488; 528/490
[58] Field of Search ............... 526/42, 263; 528/485, 528/488, 490; 424/80

[56] References Cited

U.S. PATENT DOCUMENTS

| | | | |
|---|---|---|---|
| 2,900,305 | 8/1959 | Siggia | 424/80 |
| 3,028,300 | 4/1962 | Cantor | 424/80 |
| 3,268,071 | 8/1966 | Puddington | 264/9 |
| 3,898,326 | 8/1975 | Cantor | 424/80 |

*Primary Examiner*—Paul R. Michl
*Attorney, Agent, or Firm*—Harry Falber

[57] ABSTRACT

Preparation of free-flowing granules of practically uniform composition and particle size consisting essentially of poly-N-vinylpyrrolidone and iodide ($I^-$) by combining with uniform thorough mixing a. a solution and/or colloidal suspension of a substance releasing iodide ions in a first solvent or solvent mixture, as well as b. a solution and/or colloidal solution and/or suspension of PVP in a second solvent or solvent mixture which possesses a surface tension different from that of the first solvent or solvent mixture, and in which PVP is at least partially soluble or wettable, and in which the substance releasing iodide ions, contained in the first solvent or solvent mixture, is insoluble or only slightly soluble;

and separating and drying the granules formed.

10 Claims, No Drawings ively used as safe antimicrobics and
PROCESS FOR THE PRODUCTION OF POLY-N-VINYLPYRROLIDONE GRANULES CONTAINING IODIDE The present invention relates to a novel process for the production of free-flowing granules consisting essentially of poly-N-vinylpyrrolidone (PVP) and iodide (I-), the granules being of practically uniform composition and particle size, which process comprises producing a. a solution and/or colloidal suspension of a substance releasing iodide ions in a first solvent or solvent mixture, as well as b. a solution and/or colloidal solution and/or suspension of PVP in a second solvent or solvent mixture which possesses a surface tension different from that of the first solvent or solvent mixture, and in which PVP is at least partially soluble or wettable, and in which the substance releasing iodide ions, contained in the first solvent or solvent mixture, is insoluble or only slightly soluble;

combining the solutions or suspensions (a) and (b), with uniform thorough mixing, in small portions to thus form a mixed-phase system; continuing the thorough mixing of the multiphase mixture; and separating and drying the formed agglomerates containing PVP and iodide.

The granules produced according to the invention are intended primarily for an improved cold formulation of PVP Iodophors, which in the field of public hygiene have become widely used as safe antimicrobics and disinfectants. In addition, the PVP-iodide granules produced according to the invention have quite generally the property of relatively rapidly and completely binding elementary iodine and iodine vapours. By virtue of the rapid absorption of iodine, the granules are suitable also as agent or filter substance for the purification of air as well as of other gases and media which contain elementary iodine, even in small amounts.

PVP-Iodophors are produced from the PVP-iodide granules obtained according to the invention by complexing with elementary iodine by means of intensive mixing, advantageously by the methods described in the Belgian patent specification No. 814,918.

PVP-Iodophors are obtained by complexing elementary iodine with the PVP-iodide granules produced according to the invention advantageously by the working procedures described in the Belgian patent specification No. 814,918.

From the Belgian patent specification No. 814,918 is known the procedure by which there are produced from PVP and an iodide pulverulent spray-dried compositions which are described as single-phase solid solutions of PVP and the respective iodide. These PVP-iodide mixtures can then be converted by 2- to 3-hours' mechanical mixing with elementary iodine at room temperature into a PVP-Iodophor complex.

A disadvantage of the process described above is that the production of the spray-dried PVP-iodide compositions demands an appreciable expenditure on equipment and a high consumption of energy. Furthermore, spray-dried products have a fairly wide particle-size distribution with a high proportion of fines. The hitherto known products obtained in this manner display adequate iodine complexing, but are essentially in the form of pulverulent solids and therefore give off dust to a greater or lesser extent. Moreover the rate of dissolving of such pulverulent preparations is, as a result of the less favourable wetting property, in many cases too low for modern requirements in industry, a factor resulting in loss of time in the preparation of solutions, or in the necessity for special stirring equipment to be employed.

In connection with the process according to the present invention, it is pointed out that working procedures to effect the agglomeration and separation of finely divided solid substances of inorganic nature from liquid suspensions or dispersions by the use of various solvent combinations are already known (see Can. J. Chem. Vol. 38 (1960), pages 1911–1916, and the USA Patent Specification No. 3,268,071). The application of multiphase systems with solvents of varying miscibility for producing soluble granules from originally finely divided organic substances, such as dyestuffs and foodstuffs, is described in the German Offenlegungsschrift No. 2,412,369. In this process the finely divided or pulverulent substances to be granulated are suspended in a liquid system, and then added, with turbulent stirring, to a second liquid solvent or solvent mixture, with the formation of granules occurring. Disadvantages of the aforementioned processes are that these do not permit of the incorporation of further constituents into the formed granules, nor do they permit of the processing of true solutions off the substances to be granulated.

Compared with the hitherto known working procedures for the production of PVP-iodide mixtures, the process of the present invention is characterised by simplicity, by a low expenditure for equipment, by high economy in operation and, in particular, by the fact that by this process there are obtained for the first time free-flowing, non-dusty and readily water-soluble granules of practically uniform particle size and of homogeneous composition. The PVP-iodide granules obtained possess similar advantageous chemical and physico-chemical properties to those of the PVP-iodide products according to the initially mentioned Belgian patent specification No. 814,918. Of particular advantage is that the present process can be performed in a very short space of time, generally within 15 to 30 minutes, and, moreover, without the use of expensive equipment, such as spray dryers or corrosion-resistant, closing mixing devices. A further advantage of the process of the invention is that it is not only suitable for batch operation but also particularly suitable for continuous operation.

The yields of PVP-iodide granules which are attainable by the process of the invention can be up to 100 percent by weight, relative to the total weight of the constituents used. In general, yields of between 75 and 100 percent by weight are obtained. The unreacted portions of iodide (I-) and PVP can, in addition to the solvents, be easily recovered from the liquid residual mixtures. Or the residual mixtures in the case of continuous operation are fed back in a circulation system, and separated as required from each other, with the constituents being then re-introduced into the circulation system of the process.

In the case of the present process it is necessary, depending on the type of solvent employed and on the temperature used, to provide the mixing vessel with reflux devices. The thorough mixing of the multiphase mixture and the addition of the solution or suspension (a) to the solution or suspension (b) — or inversely — is performed in small portions, e.g. by the dropwise addition, or injection through a nozzle system, of the portions added. The rate of addition should be adjusted to ensure that the formation of the desired agglomerates proceeds continuously. In the thorough mixing of the multiphase system, e.g. by stirring, care must be taken to avoid the occurrence of shearing forces and of turbulence in the mixture. Otherwise the formation of agglomerates would be prevented or impaired.

The agglomerates are separated from the liquid multiphase system in a manner known per se, e.g. by filtration, and dried at a suitable temperature.

The process of the invention is preferably performed at room temperature. It has however been shown that it is possible to operate at 0° C and below, as well as up to a temperature of 50° C and above. The possibility of being able to operate within a fairly wide temperature range depends largely on the nature of the employed solvent.

Sodium iodide or potassium iodide are preferred as substances releasing iodide ions. It is however possible to work with all water-soluble substances releasing iodide ions, including the iodides of potassium, lithium, magnesium, calcium, aluminium, ammonium, amino and quaternary ammonium, as well as hydriodic acid.

As solvents suitable for the process of the present invention, there may be mentioned representatives having solvent properties of the following classes of solvents: alcohols, esters, carboxylic acids, ethers, ketones, ketone alcohols, amides, lactams, amines, hydrocarbons, halogenated hydrocarbons and water. The following are, for example, suitable:

2-diethylaminoethanol, diacetone alcohol, propylene glycol, butanol (2), methanol, frigen, cyclohexane, chloroform, ethyl acetate, cyclohexanol, ethyl formiates, citric acid triethyl ester, ethylene glycol mono-n-butyl ester, butanol 1, benzoic acid benzyl ester, benzyl alcohol, ethylene glycol monoethyl ether, ethanolamine, ethylene glycol monomethyl ether, ethylene glycol, 2-acetoxy-ethanol, ethylenediamine hydrate, diethylacetamide, diethylcarbamate, N,N-dimethylformamide, 1,2-diethoxyethane, dioctylphthalate, diethylamine, dioxane, dimethylsulphoxide, N,N-dimethylacetamide, di-iso-propyl ether, dipentenes, n-hexane, hexadecyl alcohol, acetic acid propyl ester, isopropyl chloride, isopropyl palmitate, n-hydroxy-ethyl-lactamide, methanesulphonic acid, methacrylic acid, mesitylene, methacrylic acid-2-hydroxyethyl ester, morpholine, n-methylprrolidone, aliphatic hydrocarbons, lactic acid ethyl ester, salicylic acid methyl ester, phthalic acid dibutyl ester, phenylethyl alcohol, myristinic acid isopropyl ester, carbon tetrachloride, propylenecarbonate, propargyl alcohol, salicyclic acid ethyl ester, 2,2-dimethyl-4-hydroxymethyl-1,3-dioxalane, phthalic acid diethyl ester, 2-propyloxy-ethanol or palmitic acid isopropyl ester.

The choice of solvents of solvent mixtures has to be made on the basis that the second solvent or solvent mixture is not capable of dissolving, to any significant extent, the substance releasing iodide ions, such as alkali iodides. On the other hand, PVP must become by the second solvent or solvent mixture dissolved, colloidally dissolved, partially dissolved, or at least so well wetted that a PVP suspension can readily form. The first solvent or solvent mixture should as far as possibly completely dissolve the substance releasing iodide ions. The process can however also be performed when the substance releasing iodide ions is present as a colloidal solution in the first solvent or solvent mixture. In order to obtain homogeneous agglomerates of granules, it is essential that the first solvent or solvent mixture has a level of surface tension that is different from that of the second solvent or solvent mixture.

The following solvents are preferably used as the first solvent or solvent mixture: aliphatic alcohols, especially those having 1–4 carbon atoms, aliphatic ketones, particularly those have 3–9 carbon atoms, alkylacetates, especially those having 2–4 carbon atoms in the alkyl group.

The following solvents are preferably used as the second solvent or solvent mixture: halogenated hydrocarbons having 1–4 carbon atoms, especially perhalogenated hydrocarbons having 1 or 2 carbon atoms, such as $CCl_4$, $CFCl_3$, $CF_3Cl_3$, $C_2F_3Cl_3$ or $C_2F_4Cl_2$, liquid hydrocarbons having 5–14 carbon atoms, such as n-hexane, cyclohexane, methylcyclohexane, octane, decane, dipentene, dodecane, tetradecane, aliphatic ethers having 2–8 carbon atoms, such as diethyl ether, tetrahydrofuran, diisopropyl ether, phthalic acid ester such as dibutylphthalate, and trialkylamines such as triethylamine.

With various solvent combinations it can be advantageous if the first solvent or solvent mixture contains an addition of water. The amount of water can be up to 20 percent by weight, preferably 0.5 – 10 percent by weight, relative to the first solvent or solvent mixture.

As the PVP-constituent it is possible to use, without limitation, all available forms which lie within the molecular-weight range of between about 5000 and 750,000, preferably between 20,000 and 40,000, including the Types K-15, K-30 and K-90 (for the significance of the K-values with regard to molecular weight and viscosity see U.S. pat. No. 2,706,701).

As already mentioned, the present invention is characterised by high yields with respect to the iodide used. It is therefore possible without difficulty to determine beforehand the desired composition of the final products, i.e. of the PVP-iodine granules, with regard to the amount of iodide contained, by the appropriate choice of the amounts of PVP and iodide in the starting solutions or starting mixtures. In general, the starting amounts of PVP and of the substance releasing iodide is so regulated that PVP-iodide granules are obtained which have a weight ratio of PVP to iodide ions (I-) of 0.5 : 1 to 1 to 40 : 1, preferably 2 : 1 to 6 : 1.

The process of the invention yields, with established working procedures, PVP-iodide granules of practically uniform particle size. By suitable choice of the solvents, of the rate of addition and of the type of dissolved or suspended starting materials, it is possible to obtain granules within a wide range of particle size. The particle size of the granules is preferably 10 μ – 3 mm, e.g. 50–500 μ.

EXAMPLE 1

A first mixture consisting of a solution of 8 g of 57% (by weight) hydriodic acid (HI) in 16.6 ml of acetone is added dropwise (rate of addition 5 ml/min.) at room temperature with stirring (200 r.p.m.), and with the use of a reflux device, to a second mixture consisting of a suspension of 25 g of PVP K-30 in 200 ml of $C_2F_3Cl_3$. There are formed on the multiphase mixture floating brown agglomerates, which are filtered off by suction and dried for 1.5 hours at 60° C in a vacuum-drying chamber. There are obtained yellow-brownish, free-flowing, non-dusty PVP-iodide granules.

The PVP-iodide granules yield after 2 hours' mixing with 10 percent by weight of iodine in a mixing drum, at room temperature, a Iodophor granulate having 9.7 percent by weight of available iodine. These Iodophor granules exhibit a very high degree of iodine complexing and have good stability.

EXAMPLE 2

The process of Example 1 is repeated with the modification that the first mixture consists of a solution of 8 g of 57% hydriodic acid in 33.3 ml of acetone, and the second mixture consists of a suspension of 25 g of PVP K-30 in 200 ml of $C_2F_3Cl_3$. The content of available iodine in the Iodophor granules obtained from the PVP-iodide granules produced as above by the method described in Example 1 is 9.5 percent by weight.

EXAMPLE 3

The process of Example 1 is repeated with however the modification that the first mixture consists of a solution of 12 g of 57% hydriodic acid in 50 ml of triacetin, and the second mixture consists of a suspension of 25 g of PVP K-30 in 200 ml of $C_2F_3Cl_3$.

EXAMPLE 4

The process of Example 1 is repeated with the modification that the first mixture consists of a solution of 4 g of 57% hydriodic acid in 16.6 ml of ethyl acetate, and the second mixture consists of a suspension of 25 g of PVP K-30 in 200 ml of $C_2F_3Cl_3$. The content of available iodide in the Iodophor granules obtained from the PVP-iodide granules produced as above by the method described in Example 1 is 9.9 percent by weight.

EXAMPLE 5

The process of Example 1 is repeated with however the modification that the first mixture consists of a solution of 10.8 g of 57% hydriodic acid in 45 ml of acetone, and the second mixture consists of a suspension of 25 g of PVP K-30 in 200 ml of n-hexane. The content of available iodine in the Iodophor granules obtained from the PVP-iodide granules produced as above by the method described in Example 1 is 9.85 percent by weight.

EXAMPLE 6

The process of Example 1 is repeated with however the modification that the first mixture consists of a solution of 12 g of 57% hydriodic acid in 50 ml of triacetin, and the second mixture consists of a suspension of 25 g of PVP K-30 in 200 ml of $CCl_4$. After addition of the triacetin solution, the resulting granulate is filtered off with suction and then dried for 2 hours at 60° C in a vacuum drying chamber. The granules are then suspended in 200 ml of $C_2F_3Cl_3$ and the suspension is stirred for 5 minutes; the granules are filtered off with suction and subsequently washed with 50 ml of clean $C_2F_3Cl_3$. Drying is afterwards carried out for 30 minutes at 60° C in a vacuum drying chamber. The content of available iodide in the Iodophor granules obtained from the PVP-iodide granules produced as above by the method described in Example 1 is 9.8 percent by weight.

EXAMPLE 7

The process of Example 1 is repeated with however the modification that the first mixture consists of a solution of 12 g of 57% hydriodic acid in 50 ml of triacetin, and the second mixture consists of a suspension of 25 g of PVP K-30 in 200 ml of cyclohexane. The content of available iodine in the Iodophor granules obtained from the PVP-iodide granules produced as above by the method described in Example 1 is 9.7 percent by weight.

EXAMPLE 8

The process of Example 1 is repeated with however the modification that the first mixture consists of a solution of 12.5 g of sodium iodide in 50 ml of triacetin and 12.5 g of 96% ethanal, and the second mixture consists of a suspension of 25 g of PVP K-30 in 200 ml of $C_2F_3Cl_3$. The content of available iodine in the Iodophor granules obtained from the PVP-iodide granules produced as above by the method described in Example 1 is 9.7 percent by weight.

EXAMPLE 9

The process of Example 1 is repeated with however the modification that the first mixture consists of a solution of 12.5 g of sodium iodide in 50 ml of ethyl acetate and 12.5 g of 96% ethanol, and the second mixture consists of a suspension of 25 g of PVP K-30 in 200 ml of $C_2F_3Cl_3$. The content of available iodine in the Iodophor granules obtained from the PVP-iodide granules produced as above by the method described in Example 1 is 9.0 percent by weight.

EXAMPLE 10

The process of Example 1 is repeated with however the modification that the first mixture consists of a solution of 12.5 g of sodium iodide in 50 ml of ethyl acetate and 12.5 g of 96% ethanol, and the second mixture consists of a suspension of 25 g of PVP K-30 in 200 ml of n-hexane. The content of available iodine in the Iodophor granules obtained from the PVP-iodide granules produced as above by the method described in Example 1 is 9.85 percent by weight.

EXAMPLE 11

The process of Example 1 is repeated with however the modification that the first mixture consists of a solution of 12.5 g of sodium iodide in 50 ml of ethyl acetate and 12.5 g of 96% ethanol, and the second mixture consists of a suspension of 25 g of PVP K-30 in 200 ml of $CCl_4$. The content of available iodine in the Iodophor granules obtained from the PVP-iodide granules produced as above by the method described in Example 1 is 8.4 percent by weight.

EXAMPLE 12

The process of Example 1 is repeated with however the modification that the first mixture consists of a solution of 12.5 g of sodium iodide in 50 ml of ethyl acetate and 12.5 g of 96% ethanol, and the second mixture consists of a suspension of 25 g of PVP K-30 in 200 ml of cyclohexane. The content of available iodine in the Iodophor granules produced as above by the method described in Example 1 is 7.86 percent by weight.

EXAMPLE 13

The process of Example 1 is repeated with however the modification that the first mixture consists of a solution of 14.5 g of sodium iodide in 1.35 g of water and 75 ml of acetone, and the second mixture consists of a suspension of 27 g of PVP K-30 in 200 ml of $C_2F_3Cl_3$.

There are obtained free-flowing, yellow granules which, after complexing with 17 percent (by weight) of iodine (by 2 hours' mixing of the PVP-iodide granules with the corresponding amount of elementary iodine in the mixing drum at room temperature), have a content of available iodine of 16 percent by weight. These Iodophor granules exhibit a very high degree of iodine complexing and have good stability.

EXAMPLE 14

The process of Example 1 is repeated with however the modification that the first mixture consists of a solution of 497.1 g of sodium iodide in 1028 ml of acetone, 46.3 g of water and 92.6 g of 96% ethanol, and the second solution consists of a suspension of 926 g of PVP K-30 in 1714 ml of $C_2F_3Cl_3$. The rate of addition is 20 ml per minute. After addition of the sodium iodide solution, the resulting product is filtered off with suction, and subsequently dried in a fluidised bed dryer for 30 minutes at 60° C. There are obtained free-flowing yellow granules which, after complexing with 17 percent (by weight) of iodine (by 2 hours' mixing of the PVP-iodide granules with the corresponding amount of elementary iodine in the mixing drum at room temperature) have a content of available iodine of 16.8 percent by weight. These Iodophor granules exhibit a very high degree of iodine complexing and have good stability.

EXAMPLE 15

The process of Example 1 is repeated with however the modification that the first mixture consists of a solution of 5 g of sodium iodide in 2 g of 96% ethanol, 1 g of water and 10 ml of acetone, and the second mixture consists of a colloidal solution or suspension of 20 g of PVP K-30 in 200 ml of tetrahydrofuran. After drying, there are obtained free-flowing granules.

The content of available iodine in the Iodophor granules obtained from the PVP-iodide granules produced as above by the method described in Example 1 is 8.9 percent by weight.

We claim:

1. Process for the production of free-flowing granules consisting essentially of poly-N-vinylpyrrolidone (PVP) and iodide ($I^-$), the granules being of practically uniform composition and particle size, which process comprises producing
    a. a solution or a colloidal suspension of a substance releasing iodide ions, in a first solvent or solvent mixture, as well as
    b. a solution or colloidal solution or suspension of PVP in a second solvent or solvent mixture which possesses a surface tension different from that of the first solvent or solvent mixture, and in which PVP is at least partially soluble or wettable, and in which the substance releasing iodide ions, contained in the first solvent or solvent mixture, is insoluble or only slightly soluble;

combining the solutions or suspensions (a) and (b), with uniform thorough mixing, in small portions to thus form a mixed-phase system; continuing the thorough mixing of the multiphase mixture; and separating and drying the formed agglomerates containing PVP and iodide.

2. Process according to claim 1 wherein the thorough mixing is effected by stirring, the manner of stirring being such that in the mixture there is essentially no occurrence of shearing forces and of turbulence.

3. Process according to claim 1 wherein the operations are performed at room temperature.

4. Process according to claim 1 wherein the employed substance releasing iodide ions is hydriodic acid, ammonium iodide or an alkali iodide, preferably sodium iodide or potassium iodide or aluminium iodide.

5. Process according to claim 1 wherein there are used, as the first solvent or solvent mixture, water, aliphatic alcohols having 1–4 carbon atoms, aliphatic ketones having 3–9 carbon atoms or alkyl acetates, or mixtures thereof.

6. Process according to claim 1 wherein there are used, as the second solvent or solvent mixture, hydrocarbons and halogenated hydrocarbons having 1–4 carbon atoms, preferably perhalogenated hydrocarbons having 1 or 2 carbon atoms.

7. Process according to claim 1 wherein there is used a first solvent or solvent mixture containing 0–20 percent by weight, of water.

8. Process according to claim 1 wherein there is used PVP having a molecular weight in the range of 5,000 – 750,000.

9. Process according to claim 1 wherein there are obtained granules having a weight ratio of PVP to iodide ions ($I^-$) of 0.5 : 1 to 40 : 1.

10. Process according to claim 1 wherein there are obtained granules having a particle size of 10 $\mu$ – 3 mm.

* * * * *